United States Patent [19]

Larsson

[11] 4,006,286
[45] Feb. 1, 1977

[54] HIGH-VOLTAGE CABLE JOINT WITH CONDUCTIVE MEANS TO DECREASE ELECTRIC FIELD INTENSITY THEREIN

[75] Inventor: Erik Georg Larsson, Spanga, Sweden

[73] Assignee: Kabeldon AB, Arlingsas, Sweden

[22] Filed: Dec. 19, 1975

[21] Appl. No.: 642,292

[30] Foreign Application Priority Data

Jan. 24, 1975 Sweden .............................. 7500774

[52] U.S. Cl. ............................. 174/73 R; 174/88 C
[51] Int. Cl.² ........................................ H02G 15/08
[58] Field of Search ........... 174/73 R, 73 SC, 84 R, 174/88 R, 88 C

[56] References Cited

UNITED STATES PATENTS 1,667,743   5/1928   Sievert et al. ................... 174/73 R
3,717,717   2/1973   Cunningham et al. ........... 174/73 R

*Primary Examiner*—Laramie E. Askin
*Attorney, Agent, or Firm*—Hane, Sullivan & Spiecens

[57] ABSTRACT

A joint in a high-voltage cable with electrical conductors surrounded by solid insulation, the conductor insulation at the joint having a coating the resistivity of which is lower than that of the conductor insulation. The space around the jointing sleeve of each joint and between the cut insulation of the conductors is filled with a weakly conducting material to a diameter which is approximately equal to the diameter of the conductor insulation, the coating being in electrical connection with the conducting material surrounding the jointing sleeve.

2 Claims, 1 Drawing Figure

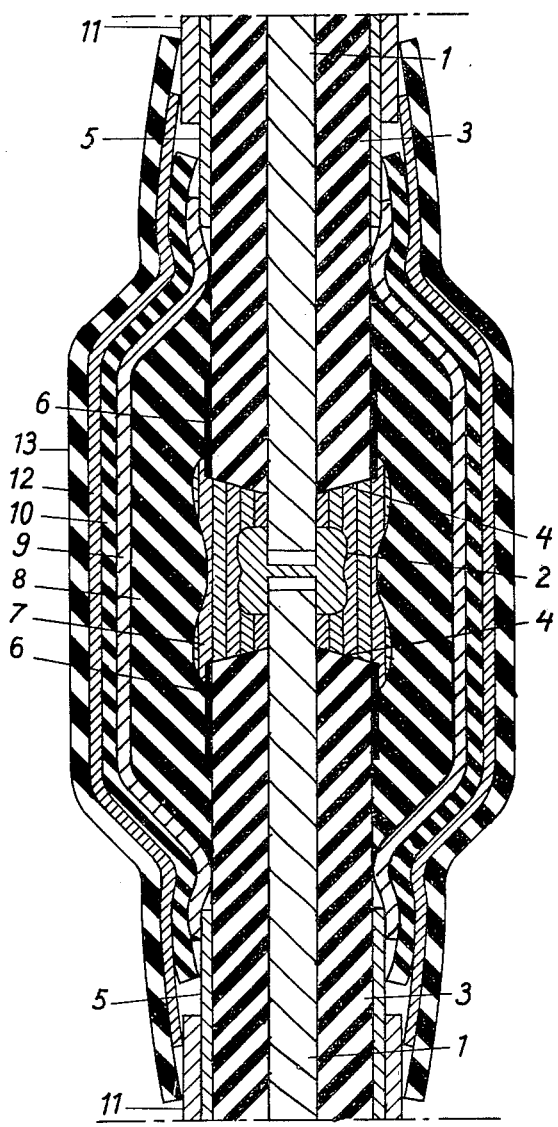

HIGH-VOLTAGE CABLE JOINT WITH CONDUCTIVE MEANS TO DECREASE ELECTRIC FIELD INTENSITY THEREIN

BACKGROUND OF THE INVENTION

The present invention relates to a joint in a high-voltage cable with electric conductors surrounded by solid insulation and the insulation of each conductor and joint being surrounded by a conducting screen, and the insulation at the joint completely or over part of its length having a coating with a resistivity which is lower than that of the conductor insulation.

In a joint in a cable where the insulation of the conductor is surrounded by a conducting screen, this screen normally is removed from the outer end of the insulation of the conductor. At the edge of the screen, the electric field intensity in the insulation becomes so high that the insulation may be damaged. It is customary that the joint in the insulation of the conductor be conically tapered with the narrow end directed towards the joint in the conductor. In a joint with this shaping, no harmful field intensity occurs in the insulation of the conductor. However, carrying out the conical termination of the solid insulation is rather difficult and demands considerable effort and time. Furthermore, it is conventional that the jointing sleeve in the connection between the conductors be wrapped with ribbons so that the outer surface of the wrapping is even and smooth. The wrapping consists of a material, the resistivity of which is lower than that of the insulation of the conductor. The jointing sleeve of metal unavoidably has some sharp corners which give rise to an increased field intensity which is detrimental to the surrounding insulation. The wrapping with conducting material assumes on its surface the same electric potential as the conductor of the cable, and, as it is even and smooth, there are no points on the surface where the field intensity can be harmful.

Swedish patent No. 164,598 shows a composition for a known compound which prevents a detrimentally high field intensity in an insulation material from originating. The beneficial effect of the compound is due to the fact that it has a voltage dependent resistivity which is always lower than that of the insulation of the conductor. However, it has not been possible so far, not even if the joint has contained said compound, to avoid the work of forming the conductor insulation into a cone.

SUMMARY OF THE INVENTION

A joint according to the invention is characterized by being a joint and a joint sleeve of a plurality of conductors surrounded by conducting material having a diameter of about the same diameter as that of the conductor insulation, and where a coating is in conducting connection with the conducting material surrounding the joint.

The conducting material around the joint functions together with the coating so that the field intensity in the insulation of the conductor becomes uniform and the same as the one which exists in the cable portion far from the joint, even if the conductor insulation at the joint is terminated substantially perpendicular to the axis of the conductor. The joint according to the invention can be made in a shorter time and demands less skill in forming than joints used in the prior art.

BRIEF DESCRIPTION OF THE DRAWING

The invention will be more readily understood with reference to the following detailed description when taken in conjunction with the accompanying drawing, wherein the only FIGURE shows a cross-sectional view through the cable joint of the invention, which joint is shown connecting two conductors of a cable.

DETAILED DESCRIPTION OF THE INVENTION

In the joint according to the invention, electrical conductors 1 are connected with a jointing sleeve 2. The insulation 3 of the conductors has its end surfaces 4, which are substantially perpendicular to the axis of the conductors, situated away from the ends of the conductors. The conductor insulation is assumed to be surrounded by a conducting screen 5 consisting of a conducting ribbon with a resistivity that is lower than that of the conductor insulation. The conducting ribbon is henceforth called a weakly conducting ribbon; the resistivity of the ribbon is namely about 100 ohm meters, while the resistivity of the conductor insulation is about $10^{13}$ ohm meters, both values being substantially independent of the electric field intensity. The weakly conducting ribbon is positioned away from the end of the conductor insulation. The outer part, about half the length, of the conductor insulation 3 is coated with a weakly conducting compound 6 with about the same resistivity as the earlier mentioned weakly conducting ribbon 5. The applied compound can be of the kind where the resistivity is substantially independent of the electric field intensity or where the resistivity is dependent on the field intensity. In some cases it can be that the coating 6 is extended to cover more of the stripped piece of the insulation so as to be in electric contact with the earlier mentioned weakly conducting ribbon 5.

The space between the end surfaces 4 of the conductor insulation and about the joint sleeve 2 is filled with wrapped weakly conducting ribbons 7 with a resistivity which is similar to that of the earlier mentioned ribbon 5. The surrounding ribbon 7 also overlaps the outer part of the outer cylindrical surface of the insulation whereby the wrapped ribbon 7 will be in electrical connection with the coating 6. The filling 7 of weakly conducting ribbons has a diameter which is the same as the diameter of the conductor insulation, but the diameter of the filling does not necessarily have to be constant over the length of the filling.

Over the whole space between the weakly conducting ribbons 5, the joint is covered with a wrapping of insulating ribbons 8, the resistivity of which is about the same as that of the conductor insulation 3.

The wrapping of insulating ribbons 8 is surrounded by a layer of weakly conducting ribbons 9 applied so that it is in electrical connection with the weakly conducting ribbon 5 over the insulation of each conductor.

Over the filling 7 of weakly conducting ribbons, the wrapping 8 of insulating ribbons has such a thickness that it can resist the potential difference between the filling 7, which has the same high potential as the conductor of the cable, and the outer layer 9 of weakly conducting ribbons, which has zero potential because of its connection with the weakly conducting ribbon 5 of each cable, which in its turn is in contact with the outer, earthed screen 11 of the cable.

The joint is covered with a layer of insulating ribbons 10 which cover all other layers of ribbons applied on the joint.

Over the described joint for a conductor, or conductors if the cable has more than one conductor, a copper net 12 is wrapped in such a manner that it makes contact with the earthed screen 11 of the cable at both ends of the joint. Wires stripped from the screens of cables are united in a joint which lies outside the copper net 12, which is not shown in the drawing.

Outermost, the whole joint is lined with preferably three layers of insulating ribbons 13.

All kinds of ribbons included in the joint, whether insulating or weakly conducting, are of the self-adhesive type.

I claim:

1. Improvement in a high-voltage cable joint for electrically connecting conductors of a cable, each conductor having a surrounding layer of solid insulation, and a conducting screen surrounding at least a portion of said conductor, said cable joint having a jointing sleeve connecting bared ends of said conductors, wherein the improvement comprises: a coating surrounding at least a portion of said solid insulation of each of said conductors, said at least a portion of said solid insulation beginning at the end of said solid insulation near said jointing sleeve, said end of said solid insulation having an end surface lying substantially perpendicular to the axis of said cable and said jointing sleeve, said coating having a resistivity lower than that of said solid insulation and which is voltage dependent; and a conducting material positioned about said jointing sleeve between the end surfaces of said solid insulating layers and in electrical communication with said coating on each solid insulation, said conducting material having a diameter approximately equal to the diameter of said solid insulation, whereby the electric field intensity is decreased.

2. The improvement according to claim 1, wherein said conducting material comprises a conducting ribbon wound about said jointing sleeve.

* * * * *